United States Patent [19]

Thurber

[11] 4,213,618
[45] Jul. 22, 1980

[54] SELF-CONTAINED ROTARY MECHANICAL SEALS

[75] Inventor: Mickey D. Thurber, Odessa, Tex.

[73] Assignee: Mechanical Seal & Service, Inc., Odessa, Tex.

[21] Appl. No.: 909,014

[22] Filed: May 24, 1978

[51] Int. Cl.² ............................................. F16J 15/34
[52] U.S. Cl. ................................. 277/93 R; 277/136
[58] Field of Search ..................... 277/88, 89, 90, 124, 277/136, 93 R, 93 SD, 41, 96.2

[56] References Cited

U.S. PATENT DOCUMENTS

| 2,894,770 | 7/1959 | Payne |  |
|---|---|---|---|
| 2,922,668 | 1/1960 | Haake |  |
| 3,157,404 | 11/1964 | Doble | 277/93 R |
| 3,162,452 | 12/1964 | Tankus | 277/86 |
| 3,198,530 | 8/1965 | Conklin | 277/85 |
| 3,250,539 | 5/1966 | Kurz et al. | 277/41 |
| 3,363,910 | 1/1968 | Toronchuk | 277/93 R |
| 3,391,942 | 7/1968 | Wilson | 277/96.2 |
| 3,467,394 | 9/1969 | Bryant | 277/124 |
| 3,472,522 | 10/1969 | Winfrey | 277/136 |
| 3,531,131 | 9/1970 | Hummer | 277/136 |
| 3,672,689 | 6/1972 | Hadley | 277/38 |
| 3,931,978 | 1/1976 | Grimston | 277/93 SD |
| 3,941,395 | 3/1976 | Ball | 277/41 |

FOREIGN PATENT DOCUMENTS 686488 5/1964 Canada .
1333612 6/1963 France .

OTHER PUBLICATIONS

Chester Advertising Brochure, Mech. Seal & Service, Inc. brochure.

*Primary Examiner*—Robert I. Smith
*Attorney, Agent, or Firm*—Gerald G. Crutsinger; John F. Booth; Harry C. Post, III

[57] ABSTRACT

A self-contained rotary mechanical seal is provided for mounting on a rotating shaft to form a seal between the shaft and structure on a housing through which the shaft extends. The seal includes an annular lug holder to be secured to the shaft as by set screws. A plurality of lugs extend from the lug holder parallel to the shaft. Tines extend circumferentially from the ends of the lugs concentric to the axis of the lug holder. A belleville washer assembly is disposed within the lugs. An annular carbon seal washer also is disposed at least partially within the lugs. The seal washer includes radially extending shoulders dimensioned to engage the lugs and tines. In assembled form, the shoulders 15 of the carbon seal washer are urged by the spring force of the belleville washers against the tines. The tines retain the carbon seal washer in a position partially within the lugs.

10 Claims, 7 Drawing Figures

SELF-CONTAINED ROTARY MECHANICAL SEALS

BACKGROUND OF INVENTION

Mechanical seals have long been known and used for forming a seal between a rotating shaft and a housing through which the shaft extends. Typically, a carbon seal washer is mounted to rotate on the rotating shaft and to slidably engage a seal seat mounted in the housing. The sliding engagement between the carbon seal washer and the seat forms a fluid-tight seal that, in conjunction with additional stationary seals, is operable to complete a fluid-tight seal between the shaft and the housing.

Often a plurality of coil springs are provided to force the carbon seal washer against the seal seat on the housing. In this assembly, the carbon seal washer is continuously urged along the shaft toward the seal seat so that the washer and the seat are maintained in a firm engagement even after both have been used for long periods of time.

However, problems have been encountered with the use of mechanical seals having coil spring forced carbon seal washers. Conventional mechanical seals utilizing a multiple coil spring arrangement often utilize coil springs mounted in a recess in the seal housing. The coil springs located in such recesses are susceptible to fouling and clogging by suspended particles and the like. The fouling of the springs may cause the seal to malfunction.

Further, in the assembly of a mechanical seal utilizing a multiple coil spring arrangement, usually, each individual spring must be properly positioned in the mechanical seal housing, and then the carbon seal washer must be forced into the seal against the spring force. Finally, some measure must be taken to retain the carbon seal washer within the seal housing resisting the spring force. This assembly procedure has proved difficult, and installation of such seal was often cumbersome. Mechanical seals of this type are generally expensive to manufacture.

SUMMARY OF THE INVENTION

The present invention overcomes the foregoing problems and others long associated with mechanical seals by using an anti-clog, self-cleaning, belleville spring arrangement and by using an annular seal housing designed to facilitate assembly. In the present invention, a mechanical seal includes an annular base for mounting on a rotating shaft within a housing. A plurality of lugs extend from the base and circumferential projections extend from the ends of the lugs. A seal washer is provided for being mounted at least partially within the lugs and is dimensioned for snuggly encompassing the shaft. The seal washer includes radial projections for engaging the circumferential projections. A spring is provided within the lugs between the base and the seal washer for urging the radial projections of the seal washer against the circumferential projections extending from the lugs. In this manner, the seal washer is retained partially within the lugs and mounted on the mechanical seal. When the mechanical seal is mounted on the shaft, the spring structure is operable to urge the seal washer against housing structure to form a seal. Also, the lugs will engage the radial projections to force the seal washer to rotate with the lugs and shaft.

In accordance with a particular aspect of the present invention, a mechanical seal is provided for use on a rotating shaft extending through a housing. An annular lug holder is dimensioned to snuggly engage the shaft and includes a plurality of fasteners for mounting the lug holder on the shaft. The lug holder includes a plurality of slots, and a plurality of lugs are mounted in the slots and extend from the lug holder in a longitudinal direction parallel to the axis of the lug holder. A plurality of tines are provided with two tines extending circumferentially from the end of each lug in a direction perpendicular to the lugs and concentric to the axis of the lug holder.

A plurality of belleville washers are dimensioned to snuggly encompass the shaft and for being disposed between the lugs and the shaft adjacent to and engaging the lug holder. The belleville washers have sufficient elasticity to resiliently oppose compression. A contact washer is provided for encompassing the shaft and for being disposed adjacent the belleville washers. An annular carbon seal washer is center-bored for snuggly encompassing the shaft and is disposed partially within the lugs adjacent the contact washer. The seal washer includes an annular recess adjacent the contact washer and an annular nose surface facing away from the lug holder. An O-ring and a back-up ring encompass the shaft and are disposed within the recess in the seal washer to form a seal between the shaft and the seal washer.

A plurality of shoulders extend radially outward from the seal washer for engaging the tines to retain the seal washer partially within the lugs. The shoulders have a sufficiently small width to pass between the confronting ends of the tines extending from adjacent lugs and have a sufficient radial extension to engage the tines and lugs. The mechanical seal may be assembled by inserting the seal washer partially within the lugs to engage the contact washer and to compress the belleville washers. The seal washer is then rotated until the shoulders engage the lugs. Then, when the seal washer is released, the belleville washers will urge the seal washer forward until the shoulders engage the tines to retain the washer on the mechanical seal.

A seal seat is mounted in the housing and includes a face surface for slidably engaging the annular nose surface of the seal washer to form a seal. The mechanical seal is positioned on the shaft relative to the housing such that the seal washer is urged against the seat by the spring force of the belleville washers. In this position, the seal washer is displaced rearwardly toward the lug holder such that the shoulders extending from the seal washer do not engage the tines.

BRIEF DESCRIPTION OF THE DRAWINGS

The advantages and further aspects of the present invention will be readily appreciated by those having ordinary skill in the art by reference to the following detailed description in connection with the accompanying drawings in which.

DETAILED DESCRIPTION

Figure 1:
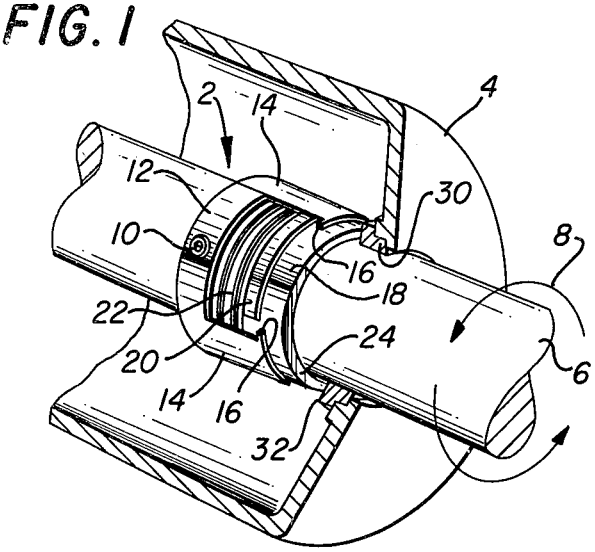
FIG. 1 illustrates a mechanical seal embodying the present invention shown mounted on a shaft extending through a broken-away housing.

Referring now to the drawings in which like reference characters refer to like or corresponding parts throughout the several views, there is shown in FIG. 1 a self-contained mechanical seal 2 embodying the present invention. A housing 4 is shown broken away for illustration purposes only with a shaft 6 shown extending through the housing 4. The shaft 6 may rotate as indicated by arrows 8 in normal operation, and the mechanical seal 2 is fixedly mounted by set screws 10 for rotating with the shaft 6. The mechanical seal 2 slidably engages the housing 4 to form a substantially fluid tight seal.

The mechanical seal 2 includes a lug holder 12 with a plurality of lugs 14 extending therefrom parallel to the shaft 6, and a plurality of tines 16 extend from the lugs 14 in a direction perpendicular to the lugs 14 and concentric to the shaft 6 and the center axis of the lug holder 12. A carbon seal washer 18 is mounted partially within the lugs 14 and includes shoulders 20 extending radially therefrom. The shoulders 20 are dimensioned for engagement with the lugs 14 and the tines 16. A plurality of belleville washers 22 are also disposed within the lugs 14 and are dimensioned to snuggly encompass the shaft 6.

A nose surface 24 on the carbon seal washer 18 is disposed facing away from the lug holder 12 for engagement with the housing 4. When belleville washers 22 are compressed between the lug holder 12 and the carbon seal washer 18, a spring force is created urging the carbon seal washer 18 forward into engagement with the housing 4.

In the position shown in FIG. 1, the shoulders 20 engage the lugs 14, but are spaced apart from the tines 16. By engaging the lugs 14, the carbon seal washer 18 is forced to rotate in unison with shaft 6 and to slide against housing 4. Since the shoulders 20 are spaced apart from the tines 16, the carbon seal washer 18 is free to move forward slightly in response to the spring force of the belleville washers 22 as the washer 18 and the housing 4 are gradually worn away over a period of time. In this manner, the carbon seal washer 18 and the housing 4 are maintained in firm sliding engagement. This sliding engagement forms a seal that, in conjunction with additional stationary seals hereinafter described, functions to complete a fluid-tight seal between the shaft 6 and the housing 4.

The various parts of seal 2 are constructed of conventional materials. The lug holder 12 and the lugs 14 are preferably made of metal such as steel. The belleville washers 22 are preferably spring steel, and the carbon seal washer 18 is constructed of a conventional carbon composition commonly used in mechanical seals.

Figure 2:
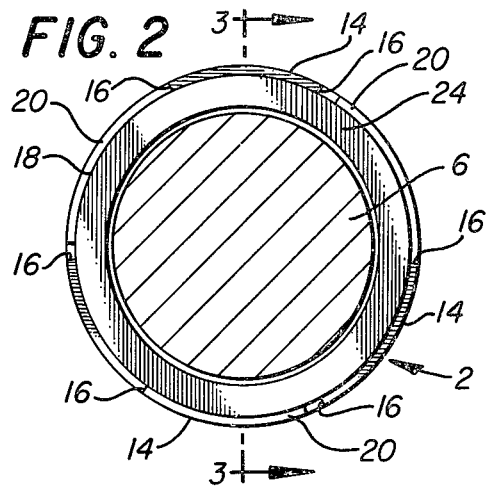
FIG. 2 is a front elevational view of the mechanical seal.

Referring now to FIG. 2, a front elevational view of the mechanical seal 2 is shown mounted on the shaft 6 with the housing completely removed for illustration purposes. In this view it may be appreciated that the shoulders 20 extend radially from the carbon seal washer 18 to an extension sufficient to engage the lugs 14 and tines 16. The shoulders 20 and the carbon seal washer 18 have been rotated clockwise on shaft 6 until the shoulders 20 engage lugs 14 and are, thus, partially hidden behind tines 16. Gaps 26 are seen between each shoulder 20 and the tines 16 and are spaced counterclockwise from the shoulders 20. It is understood that the shoulders 20 may also be rotated counterclockwise to engage the lugs 14, and in such case, the gaps 26 would be disposed in a clockwise direction from the shoulders 20.

Figure 3:
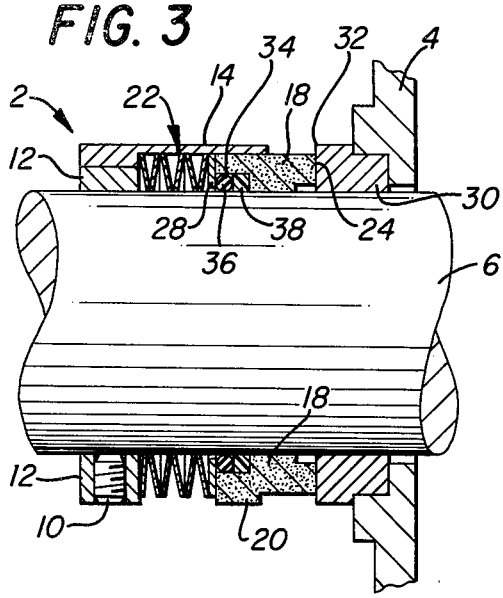
FIG. 3 is a cross section of the mechanical seal and housing with the seal cross section being taken generally through the line 3—3 shown in FIG. 2.

Referring now to FIG. 3, a cross section view is shown of the seal 2 mounted on the shaft 6 and engaging the housing 4. The cross section of the seal, itself, is taken generally through the line 3—3 shown in FIG. 2. Lug holder 12 extends radially outwardly from the shaft 6 and is secured thereto by the set screws 10. A lug 14 is shown extending from lug holder 12 in a direction generally parallel to shaft 6 and toward the housing 4. The belleville washers 22 are disposed on shaft 6 within the lugs 14, and a contact washer 28 is positioned on the shaft 6 between the belleville washers 22 and the carbon seal washer 18. The belleville washers 22 are compressed such that a spring force is transmitted through contact washer 28 to urge the carbon seal washer 18 forward along shaft 6 away from lug holder 12.

The housing 4 is shown broken away in FIG. 3, and includes a seal seat 30. The junction between the housing 4 and the seal seat 30 is a fluid-tight seal. The seal seat 30 is disposed snuggly circumscribing shaft 6 and includes a contact surface 32 disposed to engage the nose surface 24 of the carbon seal washer 18. The spring force generated by the belleville washers 22 maintains nose surface 24 and contact surface 32 in continuous firm engagement. When shaft 6 is rotating, the nose surface 24 slides against the contact surface 32 to form a sliding fluid-tight seal.

An annular recess 34 is provided in the carbon seal washer 18 adjacent the contact washer 28. An O-ring 36 and a back-up ring 38 are disposed within the annular recess 34 to form a stationary fluid-tight seal between the carbon seal washer 18 and the shaft 6. The O-ring 36 may be made of any rubber-like material selected to resist deterioration from exposure to water, detergent, oil and petroleum products. The back-up ring 38 may be constructed of any suitable material, but is preferably made of polytetrafluroethylene.

Figure 4:
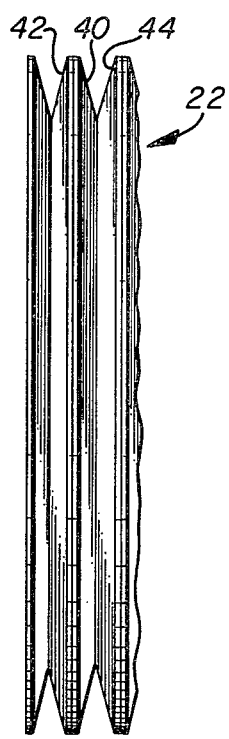
FIG. 4 is a side view of an assembly of belleville washers.

Referring now to FIG. 4, a detail view of the belleville washers 22 is shown as they are arranged within seal 2 in FIGS. 1 and 2. It is to be understood that the belleville washers are symbolically shown throughout the several views. For clarity of illustration, a small number of belleville washers 22 have been shown in the several views, and the belleville washers 22 are generally disproportionally magnified. When arranged within the seal 2, the belleville washers are alternately oriented in opposite directions such that each belleville washer 22 is facing in a direction opposite from the direction of the adjacent belleville washers 22. Thus, in FIG. 4, belleville washer 40 is oriented facing the left. The belleville washers 42 and 44 are positioned on opposite sides of belleville washer 40 and are oriented facing to the right. In this arrangement, the belleville washers 22 are compressible, and the spring force of the compressed belleville washers 22 will resiliently resist a compression force.

Figure 5:
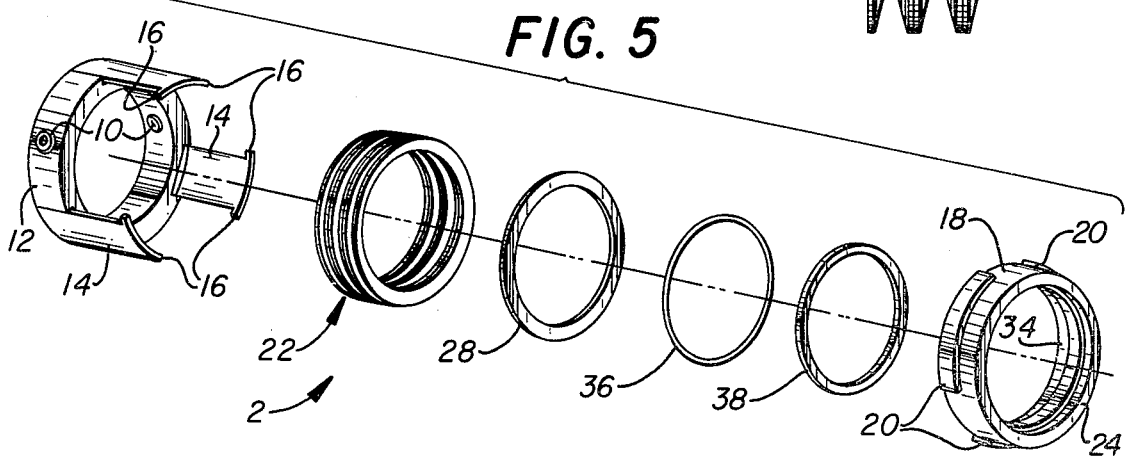
FIG. 5 is an exploded view of the mechanical seal.

Referring now to FIG. 5, the mechanical seal 2 is shown in an exploded view with each individual part shown separately as they would appear just prior to final assembly of the seal 2. The belleville washers 22, the contact washer 28, the O-ring 36, the back-up ring 39 and the carbon seal washer 18 are aligned with the lug holder 12 and the lugs 14 in a position for assembly.

To assemble the mechanical seal 2, the belleville washers 22 and the contact washer 28 are first inserted between lugs 14 with the first of belleville washers 22 contacting the lug holder 12. Next, the back-up ring 38 and the O-ring 36 are inserted into the recess 34 in the carbon seal washer 18. Finally, the carbon seal washer 18 is inserted partially within the lugs 14 with the shoulders 20 of the carbon seal washer 18 passing between the tines 16 extending from the lugs 14. The carbon seal washer 18 is forced rearwardly compressing the belleville washers 22 until the shoulders 20 clear or pass by the confronting ends of the tines 16. At this point, the carbon seal washer 18 is rotated in either direction until the shoulders 20 engage the lugs 14. When the carbon seal washer 18 is released, the spring force of the belleville washers 22 will force the carbon seal washer 18 forward until the shoulders 20 engage the tines 16 20 to retain the carbon seal washer 18 partially within the lugs 14. A primary function of the tines 16 is to retain the carbon seal washer 18 in the assembled position until the mechanical seal 2 is mounted on a shaft, such as shaft 6 shown in FIG. 1.

Figure 6:
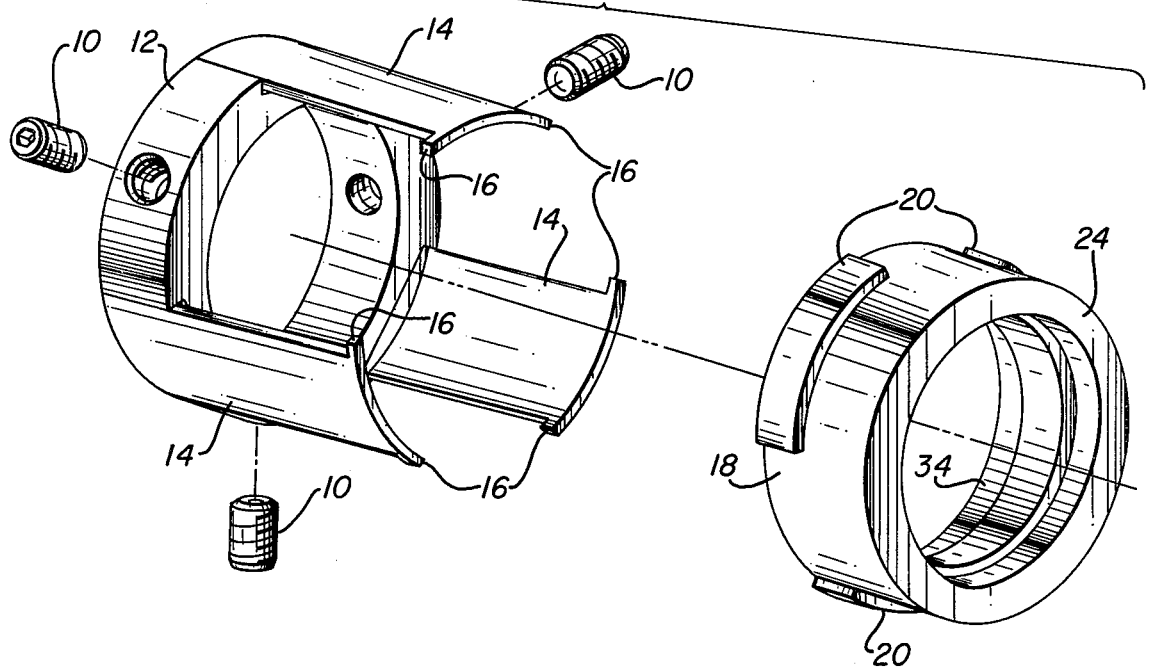
FIG. 6 is a view of the lugs, the lug holder.

Referring now to FIG. 6, a view of the lug holder 12, the lugs 14 and the carbon seal washer 18 is shown with the carbon seal washer 18 aligned for assembly with the lugs 14 and lug holder 12. In this enlarged view, the interaction between the shoulders 20 and the tines 16 may be readily appreciated. The shoulders 20 on the carbon seal washer 18 are dimensioned to have a sufficient radial extension to engage the lugs 14 and the tines 16, and the shoulders 20 are dimensioned to have a sufficiently small concentric width to pass between the confronting ends of the tines 16 extending from the adjacent lugs 14. Thus, during the assembly process, the shoulders 20 will narrowly pass between the tines 16. After the shoulders 20 have been moved toward the lug holder 12 until they have completely passed or cleared the tines 16, 10 the carbon seal washer 18 may be rotated until the shoulders 20 engage the lugs 14. The carbon seal washer 18 will then be moved forward until the shoulders 20 engage the tines 16.

The shoulders 20 perform a dual function with regard to the mechanical seal 2. Before the mechanical seal 2 is mounted on a shaft, the shoulders 20 are forced against the tines 16 to retain the carbon seal washer 18 in a proper assembled position. After the mechanical seal 2 is mounted on a shaft 6 as shown in FIG. 1, the shoulders 20 no longer engage the tines 16. However, the shoulders 20 continue to engage the lugs 14 to insure that the carbon seal washer 18 rotates in unison with the lugs 14 when mounted on a shaft. If the direction of shaft rotation changes, some slippage of the carbon seal washer 18 may occur relative to the lugs 14 as the shoulders 20 move from clockwise engagement with the lugs 14 to counterclockwise engagement with the lugs 14, or visa versa. This possibility of a small amount of slippage should not affect the performance of the mechanical seal 2 in any application.

Figure 7:
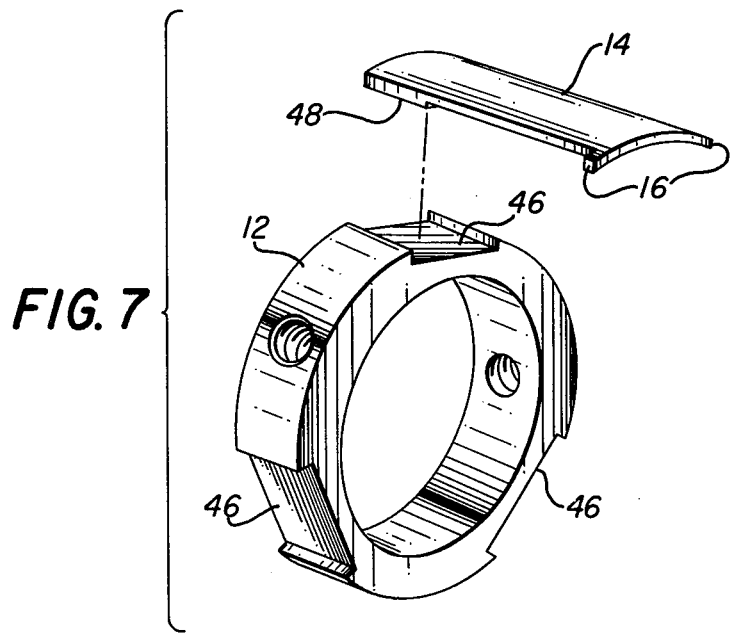
FIG. 7 is a detail view of a lug removed from the lug holder.

Referring now to FIG. 7, an exploded view of the lug holder 12 and the lugs 14 is shown. It is preferred to manufacture the lugs 14 as separate units apart from the lug holder 12. In order to mount lugs 14 on the lug holder 12, slots 46 are provided in the lug holder 12, and corresponding base portions 48 are provided on the lugs 14 and are dimensioned to fit snuggly within the slots 46. The lugs 14 are mounted on lug holder 12 by welding the base portion 48 in the slot 46. When mounted, the outer surfaces of the lug holder 12 and the lugs 14 form one continuous smooth surface. It is to be understood that the lugs 14 and the lug holder 12 may be forged or cast as a single unit without departing from the spirit of the present invention.

Although a particular embodiment of the present invention has been described in the foregoing detailed description, it will be understood that the present invention is not limited to the embodiment disclosed; but is capable of numerous modifications, rearrangements and substitutions of parts without departing from the spirit of the invention.

What is claimed is:

1. In a rotary mechanical seal of the type having an annular base adapted for mounting on a rotating shaft, a seal washer, and a spring means located between the base and the seal washer for urging said seal washer against a housing through which the shaft extends to form a seal, the improvement comprising:
   a plurality of longitudinal lugs extending from said annular base in circumferentially and radially spaced-apart relationship with said shaft such that said spring means and seal washer can be received between said lugs and shaft;
   circumferential projections extending away from said lugs on the ends of said lugs opposite said base; and
   a plurality of circumferential projections extending radially outward from said seal washer in circumferential spaced-apart relationship sufficient for receiving said lugs therebetween so that said seal washer and base can be engaged for rotation and secured against longitudinal separation under the action of the spring means by inserting said seal washer under said lugs and twisting said seal washer until the seal washer projections are locked behind the lug projections.

2. The mechanical seal as set forth in claim 1 wherein said spring means comprises:
   a plurality of belleville washers encompassing said shaft, between said annular base and said seal washer for urging the seal washer against the housing.

3. The improvement as set forth in claim 2 further comprising:
   a contact washer disposed between said belleville washers and said seal washer;
   an annular recess in said seal washer adjacent said contact washer;
   an O-ring encompassing the shaft and disposed within the recess in said seal washer adjacent said contact washer to form a seal between said shaft and seal washer; and
   a back-up ring encompassing said shaft and disposed within the recess in said seal washer and adjacent said O-ring.

4. A mechanical seal adapted for attachment to a rotating shaft extending through a housing, comprising:
   an annular lug holder adapted to be secured for rotation with said shaft;
   a plurality of longitudinal lugs extending from the lug holder toward the housing in circumferentially and radially spaced-apart relationship with said shaft;
   a seal washer center-bored to snuggly receive said shaft and disposed partially within said lugs;
   spring means disposed between said lug holder and said seal washer for urging said seal washer away from said lug holder;

circumferential projections extending away from opposite sides of said lugs; and a plurality of circumferential projections extending radially outward from said seal washer in circumferential spaced-apart relationship sufficient for receiving said lugs therebetween so that said seal washer and lug holder can be engaged for rotation and secured against longitudinal separation under the action of said spring means by inserting said seal washer under said lugs and twisting said seal washer until the seal washer projections are locked behind the lug projections.

5. The mechanical seal as set forth in claim 4 wherein said spring means comprises a plurality of belleville washers disposed between said lug holder and said seal washer.

6. The mechanical seal as set forth in claim 4 further comprising:

an annular recess in the face of said seal washer adjacent said spring means; and an O-ring disposed within said offset.

7. The mechanical seal as set forth in claim 6 further comprising a back-up ring disposed within said recess adjacent said O-ring.

8. A mechanical seal adapted for attachment to a rotating shaft extending through a housing, comprising:

an annular lug holder including a plurality of fasteners for fixedly mounting said lug holder on the shaft for rotation therewith;

a plurality of longitudinal lugs, each having distal and proximal ends and being mounted at the proximal ends thereof to said lug holder in circumferentially and radially spaced-apart relationship with the shaft;

a plurality of tines, two of said tines extending circumferentially from opposite sides of the distal end of each of said lugs and substantially perpendicular to said lugs;

a plurality of belleville washers disposed inside said lugs adjacent to and engaging said lug holder, said belleville washers having sufficient elasticity to resiliently opposed compression;

an annular seal washer disposed partially within said lugs, said seal washer including an annular nose surface facing away from said lug holder and said washers; and a plurality of shoulders extending outward from said seal washer in spaced-apart circumferential arrangement for cooperating with said lugs and the tines thereon so that said seal washer and lug holder can be engaged for rotation and secured against longitudinal separation under the action of said belleville washers by inserting and twisting said seal washer into said lugs.

9. The mechanical seal as set forth in claim 8 further comprising a contact washer disposed between said belleville washers and said seal washer to transmit the spring force from the belleville washers to the seal washer.

10. The mechanical seal as set forth in claim 8 further comprising:

an annular interior recess in said seal washer;

an O-ring disposed within said recess; and a back-up ring disposed within said recess.

* * * * *